Figure 1:
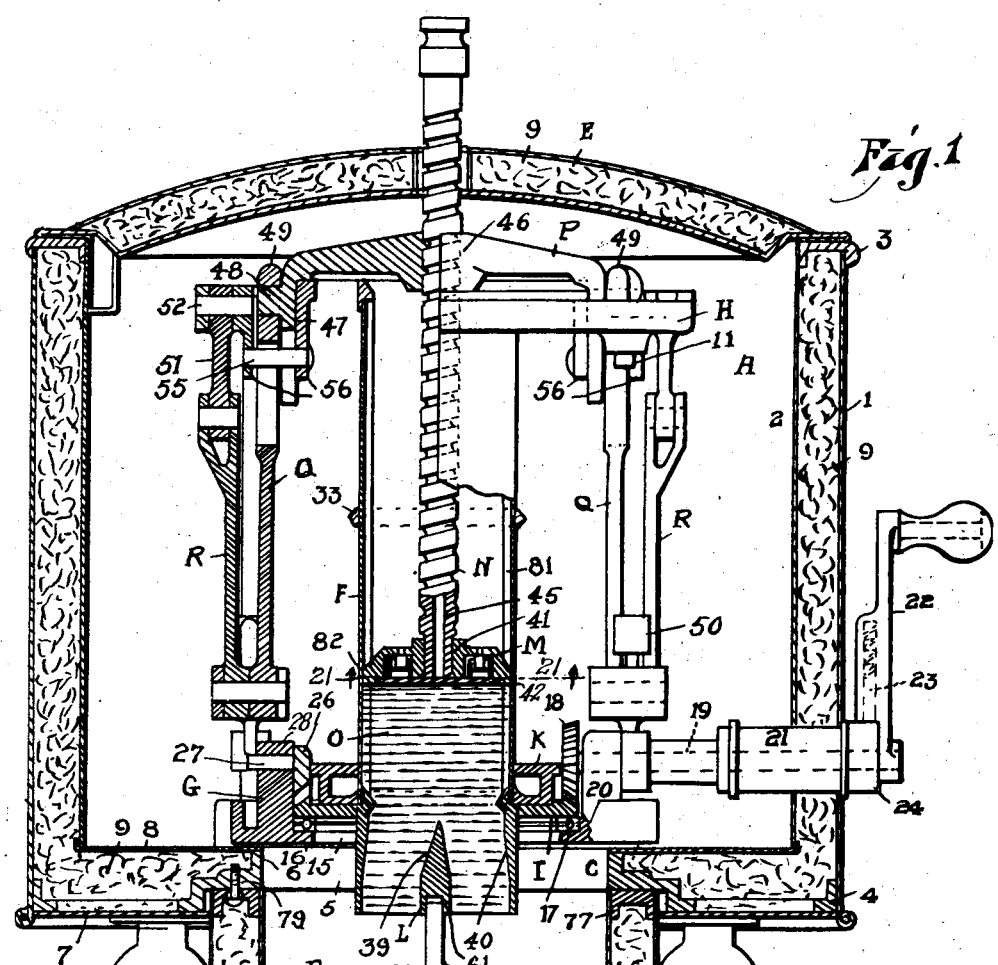

Aug. 23, 1927.

L. L. KNOX ET AL 1,640,126

PORTIONING MACHINE

Filed June 16, 1923

5 Sheets-Sheet 1

INVENTORS
Luther L. Knox and
William H. Lowry
by Edward A. Lawrence
their attorney.

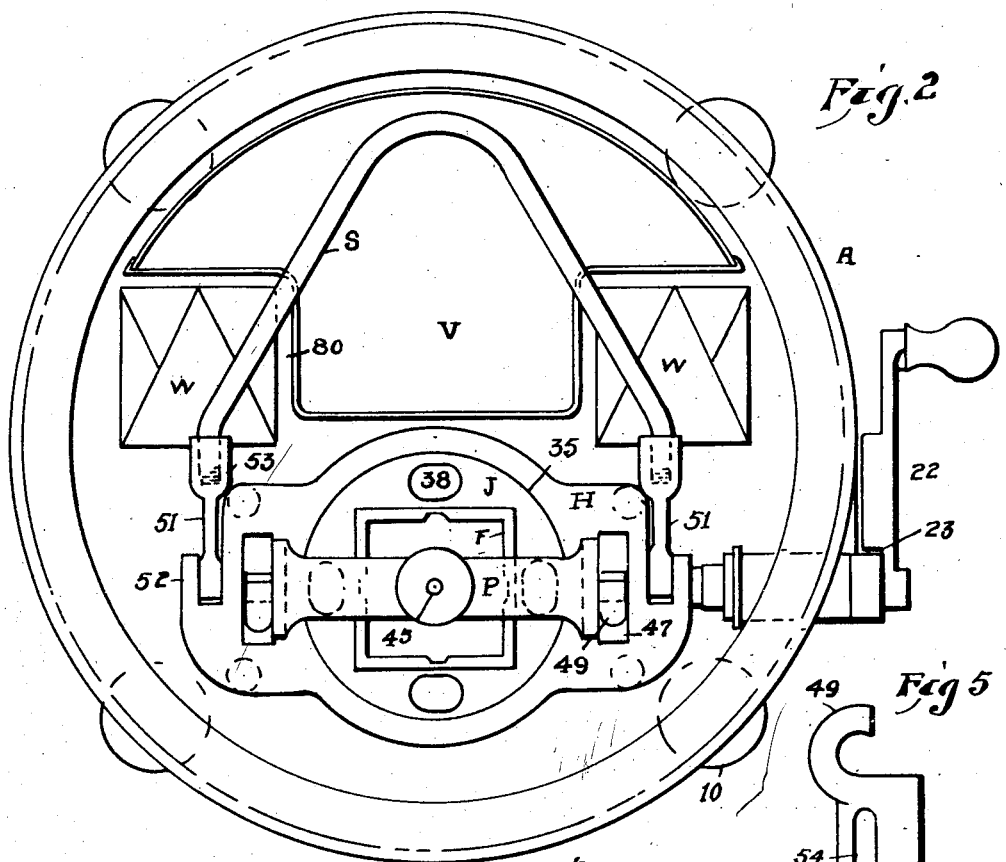
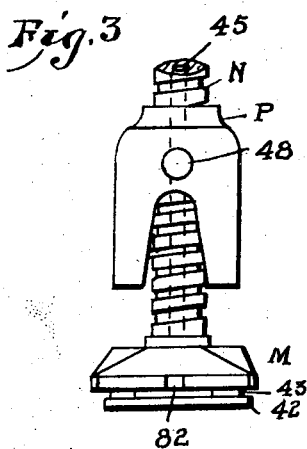
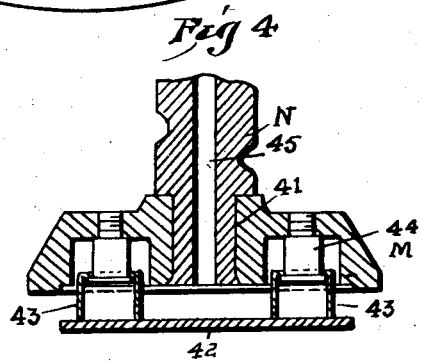
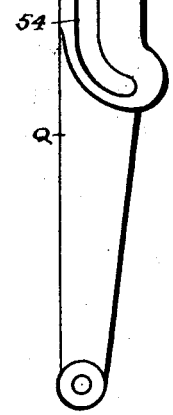

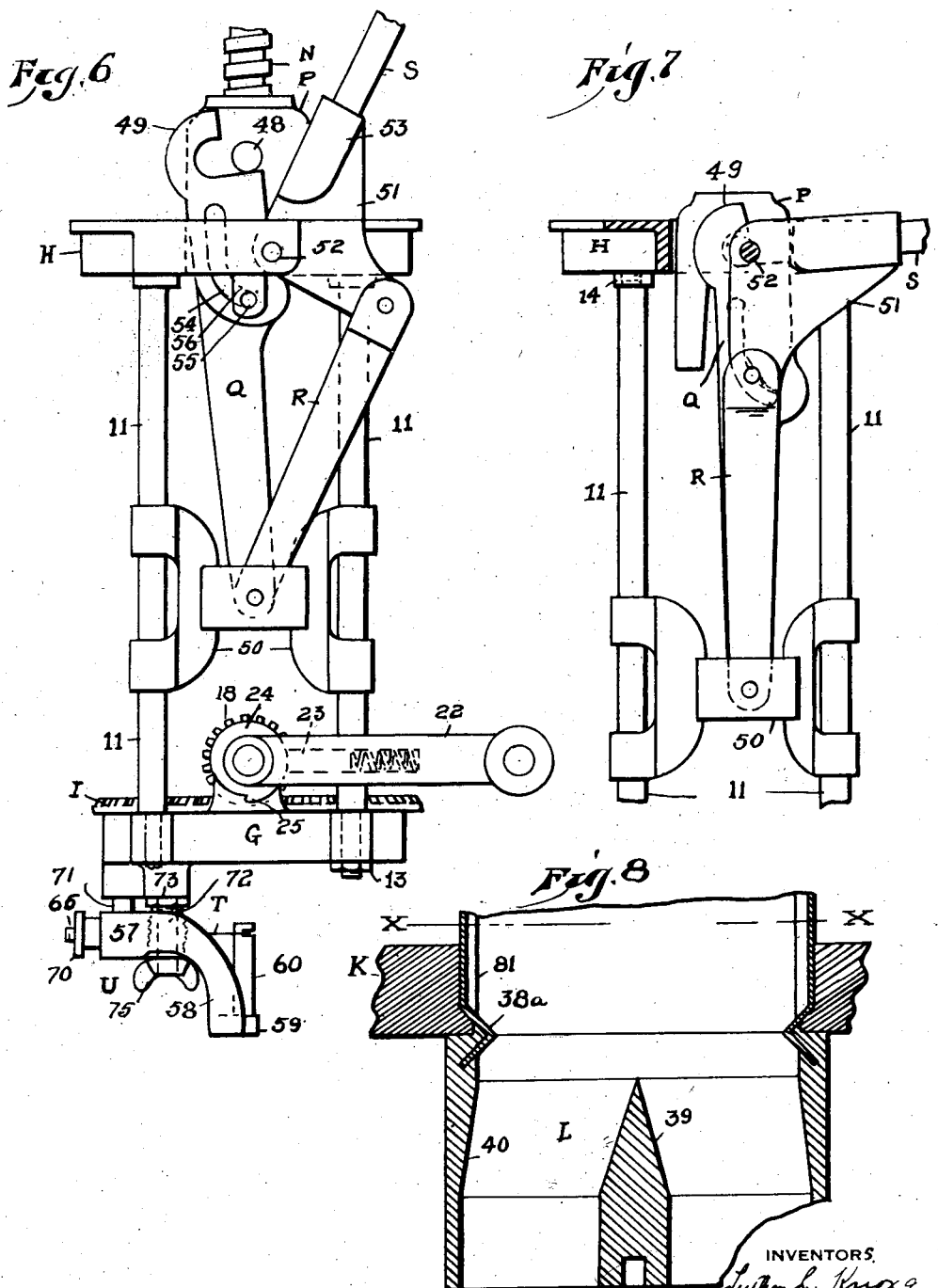

Aug. 23, 1927.

L. L. KNOX ET AL 1,640,126

PORTIONING MACHINE

Filed June 16, 1923

5 Sheets-Sheet 4

INVENTORS.

Aug. 23, 1927.
L. L. KNOX ET AL
1,640,126
PORTIONING MACHINE
Filed June 16, 1923
5 Sheets-Sheet 5
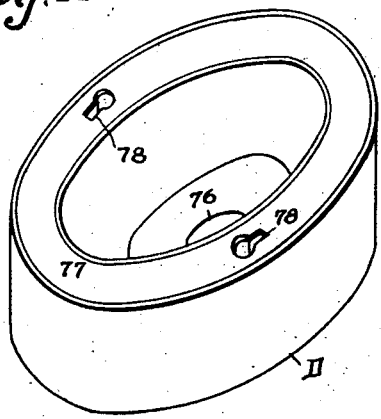
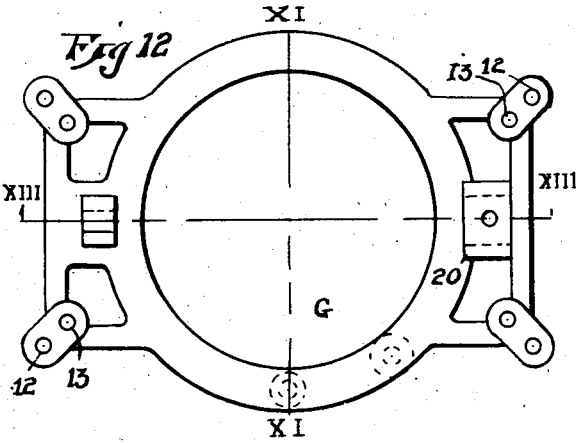
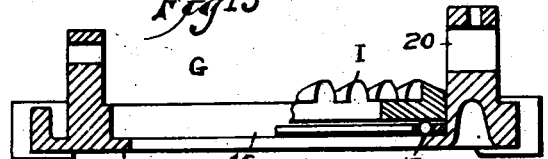
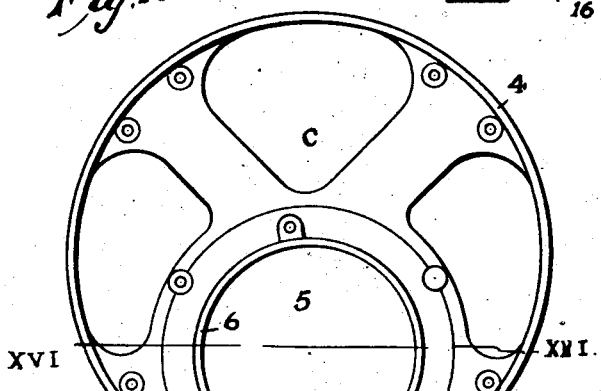
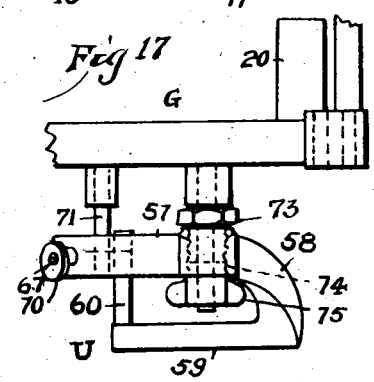
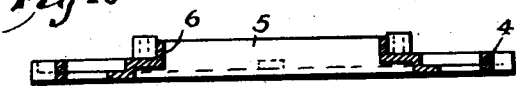
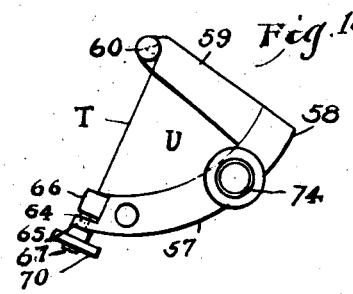
INVENTORS Patented Aug. 23, 1927.

1,640,126

UNITED STATES PATENT OFFICE.

LUTHER L. KNOX, OF BELLEVUE BOROUGH, AND WILLIAM H. LEWIS, OF PITTSBURGH, PENNSYLVANIA.

PORTIONING MACHINE.

Application filed June 16, 1923. Serial No. 645,722.

Our invention consists in new and useful improvements in machines for forming and dispensing individual portions of butter or similar substances. More particularly our invention relates to the general type of portioning machines wherein a bar of butter or other substance is projected or caused to protrude from the discharge end of a dispensing tube and said protruding end is sliced off to form a portion or portions.

Generally speaking our new and improved portioning machine is of the following construction.

The dispensing tube, in which the bar of butter is contained is caused to rotate on its longitudinal axis, and is provided with a piston which is caused to travel along said tube by the rotation of the latter, thus causing the end of the bar to protrude from the discharge end of the tube, the protruding end being sliced off by cutting means preferably rendered operative by the rotation of the tube to form and detach the portions.

The form of cutting means which we show and prefer to use is stationary and located at the discharge end of the tube, the rotation of the tube forcing the end of the bar against the cutter to produce the slicing action. To render the operation of the machine more rapid and to increase its output, we provide means whereby the end of the bar of butter is split longitudinally into a plurality of sections prior to its being sliced transversely. This produces a plurality of individual portions for each complete severance at the protruding end of the bar and for each complete rotation of the dispensing tube, said portions being sliced off in turn and being progressively dispensed. We are thus able to use a dispensing tube of sufficient capacity to receive a bar of butter of several times the cross sectional size of the bars required for machines which slice through the entire cross section of the bar of butter to form a portion. We therefore effect a substantial saving in labor and time in preparing the bars for the machine and we also greatly expedite the operation of the machine.

The cutting means which we show is in the form of a taut wire or thin cutting member mounted at the discharge end of the tube, and is so disposed that its cutting line is angular to the sides of the bar and of the sections into which the bar is longitudinally split so that the completion of a cutting action is at the corner of a portion, thereby expediting its detachment and fall into the waiting butter plate or other receptacle.

Bars of butter when cut from a tub or other container, although of substantially the same dimensions, will vary greatly in weight, owing to the fact that the butter is full of voids and gaps. Such bars are not fitted for slicing into individual portions, because the portions will not be uniform either in size or weight. It is therefore necessary to first compact the bar into uniform density before it is protruded from the dispensing tube and sliced into portions.

Furthermore, the bar is cut smaller than the tube to facilitate its insertion therein and therefore must also be faced down and spread to properly fill the tube to enable uniform cuts to be obtained.

We provide means for such compacting prior to the formation of the portions from the bar.

The means which we show for such preliminary compacting of the bar in the dispensing tube are as follows.

The screw shaft, to the end of which the piston is attached is screwed into a stationary nut which is carried by or integral with a cross head mounted at the upper or inlet end of the dispensing tube, and said cross head is provided at its opposite ends with trunnions which are engaged by the upper ends of links whose lower ends are connected to slides which work on fixed guides. Said slides are connected to the lower ends of toggle levers whose upper ends are pivoted to fixed points. Thus when the toggle levers are contracted the piston is elevated in the tube, but when the toggle levers are extended the piston is forced downwardly into the tube against the upper end of the bar of butter.

To enable the cross head to be disengaged from the links, so that the cross head and the piston may be readily removed from the machine, the lower ends of the links are pivotally attached to the slides and the upper ends of the links are provided with hooks which engage the trunnions on the ends of the cross head; and means are provided whereby when the links reach their upper position they are automatically disengaged from the trunnions of the cross heads.

Thus, the upper ends of the links are in the form of hooks which engage the trunnions, and the links are provided with longitudinal slots which are engaged by fixed pins, the lower ends of said slots being inclined at an angle, so that when the links are raised and the pins engage the lower ends of said slots the links are shifted to one side, disengaging the hooks from the trunnions.

The lower end of the tube is contracted in capacity so as to resist the downward movement of the bar, thereby causing the movement of the piston against the upper end of the bar to result in compacting the substance of the bar into uniform density. Thus we provide the lower end of the tube with an internal shoulder, said shoulder being just above the splitting means where the latter is provided. The aggregate cross sectional capacity of said splitting means is also preferably less than that of the tube, thereby aiding in the compacting action.

We provide means for the escape of air up past the piston as the same is forced down in the tube against the butter, said means being shown as projections or teeth on the sides of the piston loosely fitting in vertical grooves in the walls of the tube.

We further provide means for breaking the vacuum beneath the piston when the latter is to be removed from above a bar of butter contained in the tube. For this purpose we show the piston screw shaft provided with an axial bore open at its upper end to atmosphere and having its lower end opening into a recess or chamber in the lower or impact face of the piston, said chamber being closed, when the piston is pressed against the end of a bar of butter, by a valve disk, which disk drops slightly when the piston is raised, thereby opening the lower end of the air passage and admitting air below the piston.

We also provide means for protecting the lower end of the tube and the protruding end of the bar of butter from the entrance of warm air.

Other novel features of construction and arrangement of parts will appear from the following description, and are hereinafter claimed.

Figure 2:
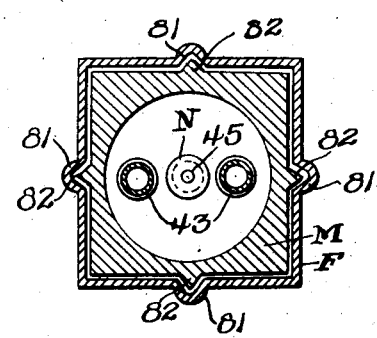
Figure 9:
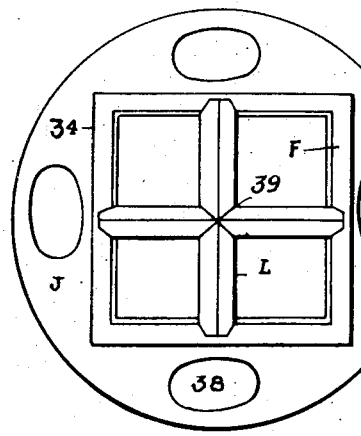
Figure 10:
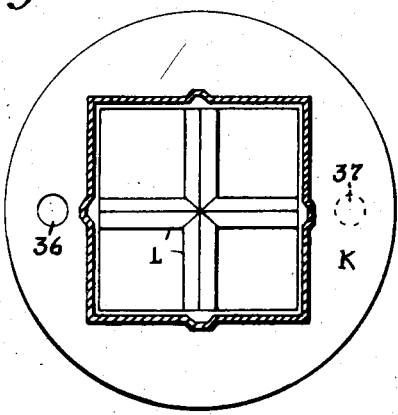
Figure 11:
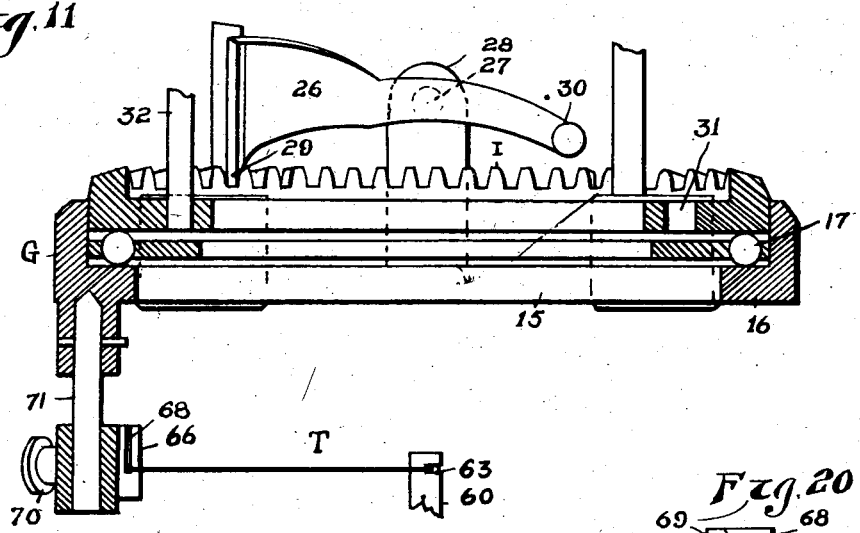
Figure 19:
Figure 20:

In the accompanying drawings which are however merely intended to illustrate a practical embodiment of the principles of our invention without limiting the scope of the latter to the construction shown, Fig. 1 is a vertical diametric section of a portioning machine embodying our present invention, the dispensing tube being shown containing a bar of butter with the piston bearing on top of the same; Fig. 2 is a plan view of the same, the lid being removed to show parts; Fig. 3 is a side view of the screw nut cross head the piston shaft and the piston, the piston being shown elevated and its vacuum breaking valve dropped; Fig. 4 is an enlarged sectional view showing the lower end of the screw shaft, the piston rigidly mounted thereon and the vacuum breaking valve; Fig. 5 is a side elevation of one of the two links which are used to raise and lower the screw nut cross head; Fig. 6 is a side elevation showing the upper and lower castings and the connecting posts which form the frame or support for the dispensing tube and also showing one of the link and toggle mechanisms for raising and lowering the screw nut cross head, the said cross head being shown in its elevated position and disengaged from the links; Fig. 7 is a similar but broken view, showing the screw nut in its lowered position; Fig. 8 is an enlarged vertical section of the lower end of the dispensing tube showing the attachment of the splitter to the dispensing tube; Fig. 9 is a top plan view of the dispensing tube showing its head plate; Fig. 10 is a sectional view of said tube taken along the line X—X in Fig. 8 and showing its foot plate; Fig. 11 is an enlarged section of the lower casting and its associate parts, said section being taken along the line XI—XI in Fig. 12; Fig. 12 is a plan view of said lower casting; Fig. 13 is a section of the same taken along the line XIII—XIII in Fig. 12; Fig. 14 is a perspective of the depending cap or boxing which protects the lower end of the dispensing tube, the splitter and the protruding end of the bar of butter from warm air; Fig. 15 is a top plan view of the spider casting which supports the floor of the outer casing; Fig. 16 is a section of the same taken along the line XVI—XVI in Fig. 15; Fig. 17 is a broken side elevation showing the supporting frame of the cutting member; Fig. 18 is an inverted plan view of the same; Fig. 19 is a detail in section illustrating the method of attaching one end of the cutting wire; and Fig. 20 is a similar view showing the attachment of the other end of the cutting wire, and Fig. 21 is a cross sectional view of the dispensing tube and piston taken along the line 21—21 on Fig. 1.

The following is a detailed description of the drawings.

The mechanism of the machine is inclosed in a suitable casing or container which also provides space for the storage of extra bars of butter or other substance to be portioned, and for a tank for ice or other refrigerant. The container is shown as circular, but may be of any shape desired. Said container is preferably provided with double metal walls with an interlining of cork or other non-conductor of heat. Thus 1 is the outer and 2 the inner sheet metal wall, the same being spaced apart at the top by the annular casting 3. The wall 1 at the bottom is soldered or otherwise attached to the upwardly extending perimetral flange 4 of the bottom casting C of the container. Said casting C is of open or spider form having an eccentrically positioned circular aperture 5 defined by an upwardly extending flange 6 which is undercut below to receive the upper end of the closure cap D to be later described in detail. 7 is a sheet metal disk which closes the lower face of the spider C around the aperture 5. 8 is a similar disk which closes the upper side of the spider C around the aperture 5. The space between the disks 7 and 8 may be filled with a non-conductor of heat, such as cork, as shown at 9, as is also the space between the walls 1 and 2.

E is a lid similarly insulated, and adapted to close the top of the container A.

The container is supported at a convenient height to give clearance for the insertion beneath the same of the butter plates or other receptacles to receive the portions. Thus we show the supporting legs 10 whose top flanges are bolted through the disk 7 to the spider C.

The dispensing tube F is removably mounted in a vertically disposed frame comprised of the bottom casting G, the posts 11 extending upwardly therefrom and the top casting H mounted on said posts.

The casting G is secured in place on the spider C by means of screws extending up through holes in said casting into threaded sockets 12 in the casting G. The posts 11 have their lower reduced extremities extending down through sockets 13 in the casting G, having nuts screwed on their protruding ends, while the upper ends of said posts are screwed into threaded sockets 14 in the casting H.

The bottom casting G is provided with a circular aperture 15 coaxial with the aperture 5 of the spider C, but of less diameter. The aperture 15 is provided with an inwardly extending bottom flange 16, thus forming a seat for the gear I supported by the ball bearings 17. The gear I is driven from without the container A, by means of a small beveled pinion 18, meshing with the gear and mounted on the inner end of the shaft 19 which is journaled in the stand 20 extending up from the casting G and in the sleeve bearing 21 which extends through the walls of the container A. The shaft 19 is provided with a crank handle 22 pinned on its outer end.

The handle 22 is provided with a spring detent 23 which is held in contact with the eccentric perimetral surface of the collar 24 fixed at the outer end of the sleeve bearing 21, said eccentric surface having an interposed radial shoulder 25 adapted to be engaged by said pawl to prevent more than a limited reverse rotation of the handle 22 but not interfering with the operative rotation of said handle in the opposite direction.

26 is a pawl pivotally mounted intermediate of its ends by means of its integral stud 27 journaled in a socket in the stand 28 extending upwardly from the casting G. One end, the heavier end of the pawl 26, is provided with a tooth 29 which tends to fall into engagement with the teeth of gear I, to lock the gear against rotation, while the other end of said lever is provided with an inwardly extending pin 30 which is in the path of the foot plate K of the dispensing tube F, as the latter is inserted down into its frame, thus disengaging the pawl from the gear I. Thus the gear is automatically locked against rotation except when the dispensing tube is mounted in the machine.

The upper face of the gear I is provided with a pin socket 31 and, at its opposite side, with the upwardly extending guide post 32 for guiding the tube F into position upon and locking it to the gear I.

The gear I is provided with a central opening of proper contour to receive the lower end of the tube F.

The dispensing tube F is made of sheet metal and may be of any cross-sectional shape, preferably non-circular. Thus we prefer to use a square tube. Intermediate of its ends it is exteriorly reinforced by the frame casting 33 which is soldered to the tube and surrounds the latter.

The upper end of the tube F is soldered or otherwise rigidly secured in the snugly fitting central aperture 34 in the circular head plate J whose perimeter fits and is journaled in the circular central aperture 35 of the top casting H, as shown in Fig. 2.

K is the circular foot plate which is provided with a central opening into which the lower portion of the tube F fits snugly and is soldered. The foot plate K rests on the gear I and is provided with a hole 36 which slides down over the guide post 32 as the tube is lowered into place in the frame, and also with a depending tapered pin 37 which seats down in the socket 31. The head plate J is provided with finger holes 38, so that by grasping the head plate the tube may be inserted down into or raised up out of its position in the machine, the guide rod 32 and the pin 37 insuring the proper disposition of the tube, as it is lowered into place. It is also evident that by turning the handle 22, the tube F may be rotated, but that when the tube is removed from the machine the gear I is locked against rotation by the pawl 26.

The lower end of the tube F is provided with a splitter L, or other suitable means for dividing the bar of butter into longitudinal sections as it is protruded from the lower end of the dispensing tube. Said splitter is preferably of pure tin which is cast in place on the lower end of the tube, the latter being kinked or bent to form the internal angular shoulder 38ª, Fig. 8, to better anchor it in the upper end of the casting. Said splitter is provided with a cruciform partition 39, having knife top edges for longitudinally splitting the bar of butter into four sections, and the same being downwardly thickened. The upper internal side walls of the splitter L are outwardly inclined, as a 40, but at a less inclination than that of the partition 39, thus choking or reducing the aggregate capacity of the four passages of the splitter to less than the cross-section capacity of the tube F. This choking or reduction of capacity at the lower end of the tube is also added to by the internal shoulder 38ª. This choking of the lower end of the tube is important in providing for compacting the bar of butter before portioning it, as will hereafter be more fully described.

M is the piston that works in the tube F and rotates in unison therewith. Said piston may be a metal casting fitting the tube. The piston is provided with an axial sleeve socket 41 into which extends the lower reduced extremity of the screw shaft N, the end of the shaft protruding and being riveted over to prevent its withdrawal and to fix the piston rigidly on the lower end of the shaft.

The lower face of the piston M is recessed and said recess is normally closed by the snugly fitting metal disk 42, making a continuous flat face for the under side of the piston when the disk is raised. To the upper side of the disk are soldered the metal cups 43 in which are contained the heads of the bolts 44 whose shanks extend through contracted holes in the top of the cups and are screwed into threaded holes in the piston. The screws are long enough to permit the disk 42 to drop below the piston M, as shown in Figs. 3 and 4, when the piston is not bearing on the upper end of a bar of butter O in the tube F. The screw shaft N is provided with an axial bore 45 open at its top to atmosphere and at its bottom to the recess in the under face of the piston M.

Thus, when an attempt is made to raise the piston out of contact with a bar of butter contained in the tube, as the piston is pulled up, the disk 42 will adhere to the butter, thus assuming its lower position relative to the piston, and thereby admitting air beneath the piston, and breaking the vacuum which would otherwise render it very difficult to raise the piston.

The screw shaft N is extended up through a fixed screw nut which consists of the threaded vertically disposed collar 46 which forms the center of a diametrically disposed cross head P whose extremities are turned downwardly into slots 47 in the upper casting H. The lower ends of said cross head are each provided with an outwardly extended trunnion pin 48 which is engaged by the hooks 49 which form the upper end of the links Q, one of said links being provided at each side. The lower ends of the links Q are pivotally attached to the slides 50 which slide vertically upon the posts 11.

R represents toggle levers whose lower ends are also pivotally connected to the slides 50. The upper ends of the levers R are pivotally attached to the bell crank levers 51 whose apices are pivotally mounted at 52 on the upper casting H. The bell crank levers 51 are provided with sockets into which are screwed the ends of the bail handle S as shown at 53.

It is evident that, if the handle S be raised from its low position, shown in Fig. 7 to its raised position shown in Fig. 6, the toggles formed by the levers R and the bell crank levers 51 will be contracted, and cross head P, the shaft N and the piston M will be raised relative to the tube F. If, on the contrary the handle be lowered from its raised to its lower position, the piston will be forced down in the tube while the latter is stationary.

The links Q are provided with longitudinally disposed slots 54 which slidably engage pins 55 which extend inwardly from the brackets 56 depending from the top casting H, thus guiding the links, and said slots 54 are inclined at their lower ends in such a manner that as the links Q approach their uppermost position, they are swung rearwardly, thus disengaging the hooks 49 from the trunnions 48, and thereby releasing the cross head P so that the cross head together with the screw shaft and the piston may be lifted from the machine.

When the bar or bars O of butter are loaded into the tube F, the handle S is raised to shift the hooks 49 to one side, the piston is inserted into the tube and the tube rotated by means of the crank handle 22 until the piston rests on the top of the butter. The handle S is then swung down to first engage the hooks 49 with the trunnions 48 of the cross head P and then by the continued depression of the handle the toggles are extended, forcing the piston down on the butter to compact the same to uniform density throughout and to fully fill the cross-sectional capacity of the tube. The necessary resistance is provided at the bottom of the tube F, by its choked construction to produce the compacting action.

T is the cutter which is in the form of a taut wire or thin cutting member so disposed at the lower end of the splitter L that the rotation of the tube F will drag the protruding end of the butter across the stationary cutter, thereby slicing the butter off to form portions which drop down. The cutter is so disposed that its final cut of a section or protruding portion of butter is at the corner of the cross section of the portion severed, instead of along the entire side of the same. Thus, as the final severance is across a corner of the portion with rapidly diminishing support, the portion drops easily without any tendency to stick to the cutting member or the butter above. To provide such cutting action the member T must be disposed in a position angular to the radius of the axis of the tube and splitter instead of radial of said axis. The action of the internal partition 39 of the splitter is to separate the sections so that the severed portions will fall freely.

The cutter T is shown stretched in a frame U attached to the under side of the bottom casting G and depending through the aperture 5 of the spider casting C. Said frame is clearly shown in Figs. 1, 6, 11, 17 and 18, and is of the following construction. 57 is a horizontally disposed arcuate plate provided at one end with a downwardly curved connecting portion 58 which supports at a lower level the inwardly extending radial arm 59 at whose inner end is a vertical post 60 whose upper end engages a shallow socket 61 in the center of the cruciform partition 39 of the splitter L.

The post 60 near its upper end is provided with a radially disposed socket 62 intersected at its inner end by a horizontal saw cut or narrow slot 63. One end of the cutter wire T is knotted and its other end is slipped inwardly through the socket 62 and drawn out through the saw cut 63 until the knot seats in the socket 62. The wire is then given a quarter turn about the post 60 in the said cut 63. The free end of the arcuate plate 57 is provided with a shouldered or angular seat 64 whose outer wall is pierced by a bolt hole 65. 66 is a block adapted to engage said seat and provided with a threaded shank 67 extending through said bolt hole. The block is provided with a horizontal saw cut 68 intersecting at its outer end with a socket 69. The other end of the cutter T is drawn through said cut 68 and knotted, the knot seating in the socket 69. A nut 70 is then tightened up on the shank 67 against the side of the plate 57, thus stretching the wire T taut.

The frame U is attached to the bottom casting G in the following manner. 71 is a short dowel pin depending from the casting G and extending into a snugly fitting vertical hole in the plate 57. 72 is a second pin depending from the casting G and having its lower end threaded. Said pin 72 extends down through the snugly fitting bore of a headed nipple 73 screwed in a threaded hole 74 in the plate 57. A nut 75 is screwed on the lower end of the pin 72 against the under face of the plate 57 with the head of the nipple 73 bearing against the casting G. It is evident that the cutter T may be adjusted up or down by adjusting the nipple 73 relative to the plate 57, thus permitting the raising or lowering of the frame U.

The cap D is formed with hollow walls interlined with cork and with a contracted central opening 76 in its bottom to permit the severed portions to drop down into the waiting butter plates. The upper edge of the cap is formed by the annular casting 77 to which the sheet metal outer and inner walls of the cap are soldered. Such casting is provided with a plurality of keyhole slots 78 which engage the headed bolts 79 depending from the flange 6 of the spider C. Thus the cap D may be readily mounted in or dismounted from place.

The lid E is provided with an opening for the upward extension of the screw shaft N.

In Fig. 2, V represents a metal tank for ice or other refrigerant which is inserted down into the container A in the rear of the portioning mechanism, thus keeping the butter refrigerated. Said tank is preferably offset at either side, as shown at 80 to provide space for the insertion of packages W containing extra bars of butter.

It is very important to prevent the entrapping of air under the piston, as the piston should impinge directly on the upper end of the bar O of butter to properly compact the butter, and also to properly extrude it from the lower end of the dispensing tube. It is also necessary to provide for the upward escape of the air which is forced out of the butter as the latter is compacted, thereby collapsing internal gaps and cavities.

Therefore we have provided the walls of the tube with the vertical grooves 81 which are traversed by the loosely fitting spurs or teeth 82 on the sides of the piston. Thus the grooves 81 are kept clear of butter and provide passages for the upward escape of air around the piston. Without some provision for this purpose the butter adhering to the walls of the tube would form a packing for the piston which would confine the air beneath the latter.

It is evident that when the butter is loaded into the tube F and the piston M is placed down on top of the same and the trunnions of the cross head P engaged by the hooked ends of the links Q, the depression of the handle S will force the piston down on the butter causing the bar or bars of butter to spread out and completely fill the tube and also compacting the butter into uniform density.

It is further evident that when the handle 22 is revolved in the proper direction, the lower end of the butter bar will be forced down through the splitter, dividing it longitudinally into the number of sections provided for by the splitter, and these protruding sections will be in turn sliced off by being forced past the cutter T. Thus the operation of protrusion takes place simultaneously with that of slicing off the portions.

The cap D, depending, as it does around the splitter and the cutter protects the same from contact with the currents of warm air which would soften the extruded butter between the operations of the machine and thus impair the cutting and discharging function. The reduced orifice in the bottom of the cap does not admit the warm air upwardly, as the cold air from the interior of the container A descends through said orifice, excluding the warm air, and thus insuring the refrigeration of the lower mechanism and the extruded end of the butter bar. We thus utilize the downward travel of the cold air to prevent the entrance of the warm air. Thus the machine may be left loaded over night without danger of the butter becoming too soft to be properly portioned, as long as the tank V is properly supplied with refrigerant.

Although for the sake of clearness in illustrating the principles of our invention we have described in detail the embodiment of the same shown in the drawings, we do not wish to limit ourselves thereby but claim broadly:

1. In a portioning machine having a rotary dispensing tube adapted to contain a bar of the substance to be portioned, a piston in said tube, means whereby the rotation of said tube causes said piston to travel along the same whereby the end of said bar will be progressively extruded from the tube, and means for intermittently slicing off the protruded end of said bar to form the portions, the combination of toggle mechanism operatively connected to said piston whereby the latter may be advanced in said tube when said tube is stationary to compact the substance to fill the full cross sectional area of the tube at substantially uniform density.

2. In a portioning machine having a rotary dispensing tube adapted to contain a bar of the substance to be portioned, a non-rotatable screw-nut member mounted adjacent to the inlet end of said tube, a screw shaft screwed through said nut, a piston in said tube fixed on the end of said shaft, said piston rotating with said tube whereby the rotation of the tube causes the end of the bar to be progressively extruded from the discharge end of said tube, and means for intermittently slicing off the extruded end of said bar to form the portions, the combination of toggle mechanism operatively connected to said screw-nut member whereby the same may be moved by a quick-action motion in axial alinement with said tube, while said tube is stationary, to cause said piston to travel in said tube for the purpose of compacting the substance to fill the full cross sectional area of said tube, and means whereby said toggle mechanism may be manually operated.

3. In a portioning machine having a rotary dispensing tube adapted to contain a bar of the substance to be portioned, a piston working in said tube and rotating therewith, a screw shaft on which said piston is mounted, a cross head mounted at the inlet end of said tube and provided with a threaded opening through which said screw shaft is screwed whereby the rotation of said tube causes the piston to travel longitudinally therein to progressively extrude the end of the bar from the discharge end of said tube, and means for intermittently slicing off the extruded end of said tube to form portions, the combination of toggle mechanism operatively connected to said cross head whereby the same may be moved relative to said tube, so that the piston may be caused to travel along the tube while the later is stationary to compact the substance of the bar to fill the cross sectional area of the tube, and means whereby when said toggle mechanism is contracted to shift said cross head away from the tube said toggle mechanism is automatically released from said cross head.

4. In a portioning machine having a support, a rotary dispensing tube mounted in said support and adapted to contain a bar of the substance to be portioned, a piston working in said tube and rotating therewith, a cross head mounted on said support adjacent to the inlet end of said tube and provided with a threaded opening, and a screw shaft screwed through said threaded opening and upon which said piston is mounted whereby the rotation of said tube causes the end of the bar to be progressively extruded from the discharge end of the tube, the combination of links slidably mounted on said support and engaging the ends of said cross head, and a handle mechanism operatively connected to said links whereby the piston may be moved longitudinally of the tube when the latter is stationary to compact the substance of the bar to fill the full cross sectional area of the tube.

5. In a portioning machine having a support, a rotary dispensing tube mounted in said support and adapted to contain a bar of the substance to be portioned, a piston working in said tube and rotating therewith, a cross head mounted on said support adjacent to the inlet end of said tube and provided with a threaded opening, and a screw shaft screwed through said threaded opening and upon which said piston is mounted whereby the rotation of said tube causes the end of the bar to be progressively extruded from the discharge end of the tube, the combination of links slidably mounted on said support and engaging the ends of said cross head, handle mechanism operatively connected to said links whereby the piston may be moved longitudinally of said tube when the latter is stationary to compact the substance of the bar to fill the full cross sectional area of the tube, and means whereby said links are automatically disengaged from said cross head when they reach the limit of their movement in moving the cross head away from the tube.

6. In a portioning machine having a support, a rotary dispensing tube mounted in said support and adapted to contain a bar of the substance to be portioned, a piston working in said tube and rotating therewith, a cross head mounted on said support adjacent to the inlet end of said tube and provided with a threaded opening, and a screw shaft screwed through said threaded opening and upon which said piston is mounted whereby the rotation of said tube causes the end of the bar to be progressively extruded from the discharge end of the tube, the combination of links slidably mounted on said support and engaging the ends of said cross head, a pin and slot connection between the links and said support for the guidance of said links, and a handle control mechanism for said links whereby when the tube is stationary the piston may be caused to travel along said tube to compact the substance of said bar to fill the full cross sectional area of the tube or may be moved away from engagement with said bar.

7. In a portioning machine having a support, a rotary dispensing tube mounted in said support and adapted to contain a bar of the substance to be portioned, a piston working in said tube and rotating therewith, a cross head mounted on said support adjacent to the inlet end of said tube and provided with a threaded opening, and a screw shaft screwed through said threaded opening and upon which said piston is mounted whereby the rotation of said tube causes the end of the bar to be progressively extruded from the discharge end of the tube, the combination of links slidably mounted on said support and engaging the ends of said cross head, a pin and slot connection between the links and said support for the guidance of said links, and a handle control mechanism for said links whereby when the tube is stationary the piston may be caused to travel along said tube to compact the substance of said bar to fill the full cross sectional area of the tube or may be moved away from engagement with said bar, said pin and slot connection being provided with an angularity whereby when said links have moved the cross head away from the tube to the limit of their movement the links are automatically disengaged from the cross head.

8. In a portioning machine having a dispensing tube adapted to contain a bar of the substance to be portioned, a piston working in the tube to extrude the end of the said bar therefrom, means for slicing off the extruded end of the bar to form the portions and a piston shaft extending into said tube and attached to said piston for moving the same in said tube, the combination therewith of a drop valve carried by the piston, said piston shaft being provided with a passage open at its outer end to atmosphere and the drop valve being arranged to close the inner end of said passage, said valve being held closed when the piston is pressed against the end of said bar of the substance to be portioned and said valve being opened by its adhesion to said bar when the piston is moved away from said bar for the purpose described.

9. In a portioning machine having an outer enclosing casing, means within said casing for containing a refrigerant, a dispensing tube within said casing adapted to be subjected to the influence of the refrigerant and adapted to receive the substance to be portioned, said tube having its discharge end extending through an opening in said casing, and means for extruding the substance from the discharge end of said tube, the combination therewith of a shielding means constituting part of said casing and surrounding the discharge end of said tube, said shielding means being spaced away from the tube to form therewith an air passage surrounding said tube for the downward passage of refrigerated air from the interior of said casing.

10. In a portioning machine having an outer enclosing casing, means within said casing for containing a refrigerant, a dispensing tube within said casing adapted to be subjected to the influence of the refrigerant and adapted to receive the substance to be portioned, said tube having its discharge end extending through an opening in said casing, and means for extruding the substance from the discharge end of said tube, the combination therewith of a flow defining means surrounding the protruding end of the tube to induce the downward passage of a column of refrigerated air from said casing and surrounding said tube.

11. In a portioning machine, having a rotary dispensing tube adapted to contain a bar of the substance to be portioned, a piston working in said tube and rotating therewith, means whereby the rotation of said tube causes said piston to be advanced along the latter to extrude the bar from the discharge end of said tube, and means for slicing the extruded end of the bar to form portions, the combinations of quick-action means for moving said piston along said tube when the latter is stationary to compact the substance of the bar to fill the full cross sectional area of the tube, the discharge end of said tube being provided with an internal resistance-member which resists the extrusion of said bar, thereby assisting in compacting.

Signed at Pittsburgh, Pa., this 11th day of June, 1923.

LUTHER L. KNOX.
WILLIAM H. LEWIS.